US007323253B2

(12) United States Patent
Isaksson et al.

(10) Patent No.: US 7,323,253 B2
(45) Date of Patent: Jan. 29, 2008

(54) CHIP BOARD AND A PROCESS FOR THE PREPARATION THEREOF

(75) Inventors: Jan Isaksson, Osby (SE); Bo Nilsson, Mölunda (SE)

(73) Assignee: Inter IKEA Systems B.V., Delft (NL)

( * ) Notice: Subject to any disclaimer, the term of this patent is extended or adjusted under 35 U.S.C. 154(b) by 0 days.

(21) Appl. No.: 10/514,061

(22) PCT Filed: May 7, 2003

(86) PCT No.: PCT/IB03/01895

§ 371 (c)(1),
(2), (4) Date: Jul. 25, 2005

(87) PCT Pub. No.: WO03/095167

PCT Pub. Date: Nov. 20, 2003

(65) Prior Publication Data

US 2006/0177648 A1 Aug. 10, 2006

(30) Foreign Application Priority Data

May 8, 2002 (DK) ........................ PA 2002 00696

(51) Int. Cl.
*B32B 5/16* (2006.01)

(52) U.S. Cl. ...................... 428/524; 428/528; 428/532; 428/535; 428/536; 428/537.1

(58) Field of Classification Search ................ 428/532, 428/535, 536, 537.1, 524, 528
See application file for complete search history.

(56) References Cited

U.S. PATENT DOCUMENTS

| | | | | |
|---|---|---|---|---|
| 4,364,984 | A * | 12/1982 | Wentworth | 428/106 |
| 5,183,622 | A * | 2/1993 | Persson | 264/320 |
| 7,004,300 | B2 * | 2/2006 | Bossler | 198/382 |

* cited by examiner

*Primary Examiner*—Leszek Kiliman
(74) *Attorney, Agent, or Firm*—Cooper & Dunham LLP

(57) ABSTRACT

A chip board including an intermediary layer (1) and a layer (2) of large chips positioned on both sides of said intermediary layer. An outer layer (3) is provided on the outer surface of each layer of large chips. In addition to the chips, the layers include an adhesive. The intermediary layer (1) includes a mixture of wood chips having chip fractions of a chip size of 0.1 to 20 mm, and the chips of this layer are randomly oriented. The individual chip in the layer (2) of large chips presents the following characteristics: a length of approx. 50 to approx. 130 mm, a width of approx. 4 to approx. 40 mm and a thickness of approx. 0.2 to approx. 2.0 mm. The chips within each layer (2) of large chips are all oriented in one and the same direction. As a result, a chip board is obtained which demonstrates a significantly higher E-module and stiffness in flexure than hitherto known despite a reduced consumption of material.

17 Claims, 1 Drawing Sheet

CHIP BOARD AND A PROCESS FOR THE PREPARATION THEREOF

TECHNICAL FIELD

The present invention relates to a furniture chip board as stated in the preamble of claim 1.

BACKGROUND ART

A chip board is known which has a core layer and an auxiliary layer on each side of the core layer. The intermediary layer includes wood chips and a binder, while the two auxiliary layers include chips. A chip board of this type is not completely satisfactory because the E-module thereof is between 2000 to 3000 N/mm$^2$ when it is bent, while the flexural strength of said chip board is 10 to 15 N/mm$^2$, which is not entirely satisfactory.

DE 10049050 A discloses a chip board including a core layer and a layer of big chips positioned on both sides of the cover layer. An outer layer is positioned on the outer surface of each layer of big chips. In addition to the chips the layers include an adhesive. The core layer includes a mixture of wood chips having chip fractions of a chip size of 0.1 to 10 mm. The chips of the core layer are randomly oriented while the individual chip in the layer of big chips presents the following characteristics: a width of 10 to 40 mm, a thickness of 0.40 to 0.85 mm. The chips within the individual layer of big chips are all directed in one direction. This chip board is not a furniture chip board.

DISCLOSURE OF INVENTION

The object of the present invention is to provide a furniture chip board of the above type, which demonstrates a significantly higher E-module and stiffness in flexure than hitherto known despite a reduced consumption of material.

According to the invention this object is achieved by a furniture chip board having the features stated in the characterising part of claim 1.

According to the invention, the core layer may include a mixture of wood chips having chip fractions of a chip size of 0.2 to 0.17 mm, while the chips of the layers of big chips may be oriented in one direction, whereby a particularly high E-module is obtained.

According to the invention, each chip of each layer of big chips may present the following characteristics: a length of 80 to 110 mm, a width of 5 to 30 mm, preferably 10 to 20 mm, and a thickness of 0.4 to 1.0 mm. These chip dimensions have turned out to be particularly advantageous.

In addition, according to the invention the chips may be kept together by 8 to 15% by weight of adhesive, preferably 10 to 13% by weight of adhesive, preferably urea-formaldehyde adhesive, i.e. UF adhesive, melamine-urea-formaldehyde adhesive, i.e. MUF adhesive, melamine-urea-phenol-formaldehyde adhesive, i.e. MUPF adhesive, isocyanate adhesive, i.e. PMDI adhesive or tannin adhesive or combinations thereof. As a result, the chip board is provided with a particularly good cohesion ability.

An embodiment of the furniture chip board according to the invention where an outer layer is positioned on the outer surface of each layer of big chips is characterised in that the outer layers include a chip mixture having chip fractions of a chip size of 0.1 to 10 mm, preferably 0.1 to 5 mm. As a result, the stiffness in flexure is particularly high, and the lateral faces of the chip board are fine and obtain a structure suitable for foiling, application of coating layers or the like.

The present invention also relates to a process for the preparation of furniture chip boards according to the invention as stated in the preamble of claim 6. This process is characterised in the features stated in the characterising part of claim 6. The process has turned out to be particularly advantageous for preparing the furniture chip board according to the invention.

A rigid 12 mm furniture chip board can tolerate the same load as a conventional 18 mm furniture board, such as a bookcase shelf. This is possible despite a reduced consumption of material.

Finally according to the invention, the furniture chip board may be produced by means of an intermittent press or by a continuous pressing procedure, the pressing period being 8 to 13 seconds per mm of the thickness dimension of the furniture chip board.

BRIEF DESCRIPTION OF THE DRAWINGS

The invention is explained in detail below with reference to the drawings, in which.

BEST MODES FOR CARRYING OUT THE INVENTION

Figure 1:
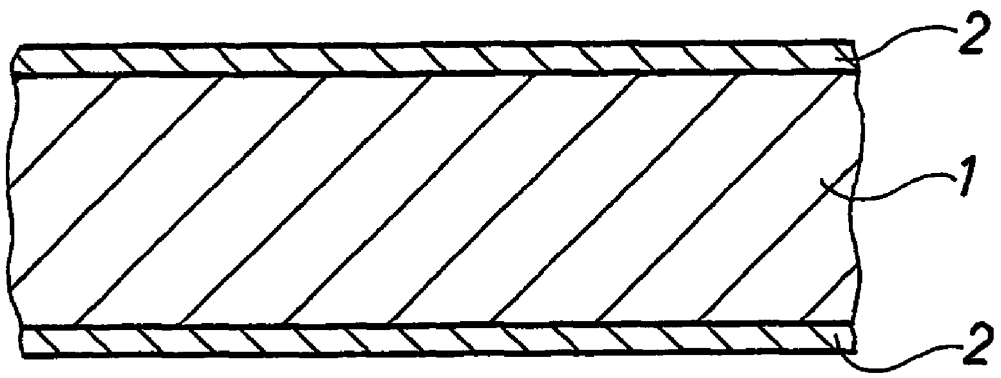
FIG. 1 is a diagrammatic cross sectional view of a furniture chip board according to the invention having a core layer and two layers of big chips.

The furniture chip board shown in FIG. 1 includes a core layer 1 and a layer 2 of big chips positioned on both sides of said core layer. In addition to the chips, the layers also include an adhesive.

The core layer 1 includes a mixture of wood chips having chip fractions of a chip size of 0.1 to 20 mm, the chips of the core layer being randomly oriented. Each chip of the individual layer 2 of big chips has a length of approx. 6 to 130 mm, a width of approx. 4 to approx. 40 mm and a thickness of approx. 0.2 to approx. 4.0 mm. The chips of each layer 2 of big chips are all oriented in one and the same direction.

The core layer 1 can include a mixture of wood chips having chip fractions of a chip size of 0.2 to 17 mm, the chips in the layers 2 of big chips being oriented in the longitudinal direction of the chip board.

Each chip of the individual layer 2 of big chips can present the following characteristics: a length of 70 to 120 mm, preferably 80 to 110 mm, a width of 5 to 30 mm, preferably 10 to 20 mm, and a thickness of 0.2 to 2.0 mm, preferably 0.4 to 1.0 mm. The chips can be kept together by 8 to 15% by weight of adhesive, preferably 10 to 13% by weight, preferably urea-formaldehyde adhesive, i.e UF adhesive, melamine-urea-formaldehyde adhesive, i.e. MUF adhesive, melamine-urea-phenol-formaldehyde adhesive, isocyanate adhesive, i.e. PMDI adhesive or tannin adhesive or combinations thereof.

Figure 2:
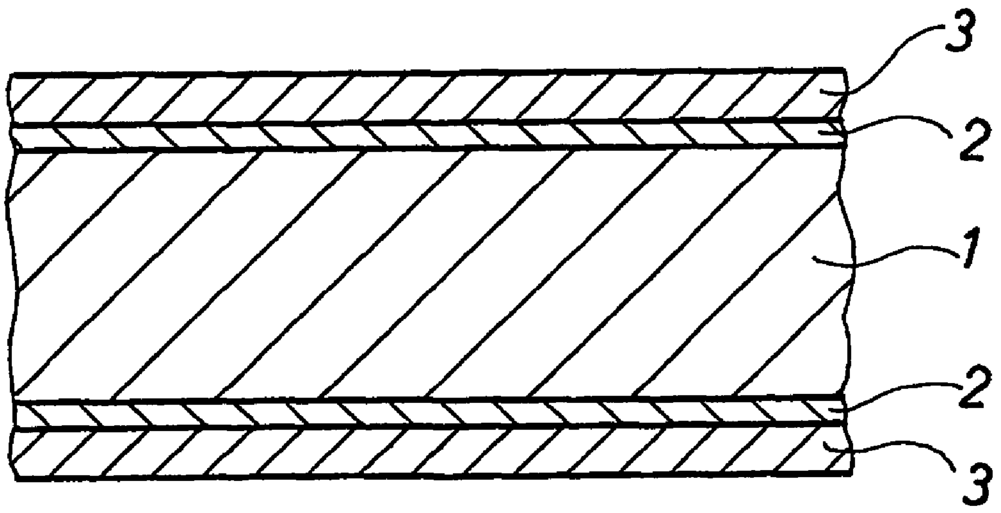
FIG. 2 is a diagrammatic cross sectional view of a furniture chip board according to the invention having a core layer, two layers of big chips and two outer layers.

As shown in FIG. 2, the chip board can include five layers: the innermost layer being a core layer 1 and on the outer surface thereof a layer 2 of big chips. Two outer layers 3 are then positioned on the outer surface of the layers 2 of chips. These outer layers can include a chip mixture having chip fractions of a chip size of 0.1 to 10 mm, preferably 0.1 to 5 mm.

Each furniture chip board can be prepared by means of an intermittent press or by a continuous pressing procedure at a temperature of 150 to 230° C. and a pressure of 20 to 50 bars, the pressing period being 5 to 15 seconds per mm of the thickness dimension of the furniture chip board.

The preparation of a furniture chip board according to the invention can include the following steps:

First, a chip mixture is scattered on a press plate, a wire, or a scatter band to provide an outer layer 3, then a chip mixture to provide a layer 2 of big chips, then a chip mixture to provide a core layer 1, then a chip mixture to provide a layer 2 of big chips and finally a chip mixture to provide an outer layer 3, every chip of the core layer 1 and optionally of the outer layers 3 being randomly oriented during the scathing, while the chips of each layer 2 of large chips being oriented in one and the same direction during the scattering, The layers are compressed by means of an intermittent press or by a continuous pressing procedure at a temperature of 150 to 230° C. and a pressure of 20 to 50 bars, the pressing period being 5 to 15 seconds per mm of the thickness dimension of the completed furniture chip board.

The components of the furniture chip board can optionally be compressed to such an extent that the chip board achieves a density of 600 to 800 kg/m$^3$, preferably 650 to 750 kg/km$^3$.

Subsequent to the pressing, the chip boards are cooled, whereafter they are optionally polished to obtain a final desired surface structure and to maintain a predetermined thickness tolerance.

EXAMPLE

A chip board was prepared having a density of 700 to 750 kg/m$^3$.

The Bending E-module was measured to be 10,000 to 13,000 N/mm$^2$. The Bending E-module for a conventional furniture chip board is in the range of 2,000 and 3,000 N/mm$^2$.

The flexural strength was measured to be 60 to 90 N/mm$^2$ for the rigid chip board compared to the usual 10 to 15 N/mm$^2$ for conventional furniture chip boards.

In other words, when a 12 mm rigid furniture chip board according to the invention is produced, it can tolerate the same load as a conventional 18 mm chip board, for instance used as a shelf, despite a reduced consumption of material.

When the thickness of the furniture chip board is maintained, the distance of support can be increased by 40%, for instance from 700 mm to 1000 mm as far as a shelf is concerned.

When the density was in the range of 400 to 500 kg/m$^3$, the resulting chip board presented properties similar to those of a conventional furniture chip board having a density of 700 kg/m$^3$. This variant can be used when it is desired to reduce the weight of a product while maintaining the strength of the product.

The remaining technical values of the furniture chip board according to the invention were at a level similar to those of an ordinary, conventional furniture chip board.

The invention can be varied in many ways without thereby deviating from the scope of the invention as expressed in the following claims.

The invention claimed is:

1. A chip board including an intermediary layer (1) and a layer (2) of large chips positioned on both sides of said intermediary layer, as well as optionally an outer layer (3) positioned on the outer surface of each layer of large chips, said layers, in addition to the chips, also including an adhesive, wherein the intermediary layer (1) consists essentially of a mixture of wood chips having chip fractions of a chip size of 0.1 to 20 mm, and that the chips of the intermediary layer (1) are randomly oriented, and the individual chip in the layer (2) of large chips presents the following characteristics: a length of approx. 50 to approx. 130 mm, a width of approx. 4 to approx. 40 mm and a thickness of approx. 0.2 to approx. 2.0 mm, and wherein the chips within the individual layer of large chips are all oriented in one and the same direction.

2. A chip board according to claim 1 wherein the intermediary layer (1) includes a mixture of wood chips having chip fractions of a chip size of 0.2 to 17 mm, and that the chips in the layer (2) of large chips are oriented in the longitudinal direction of the chip board.

3. A chip board according to claim 1 wherein the individual chip of the individual layer (2) of large chips presents the following characteristics: a length of 70 to 120 mm, a width of 5 to 30 mm, and a thickness of 0.2 to 2.0 mm.

4. A chip board according to claim 1 wherein the chips are kept together by 8 to 15% by weight of adhesive.

5. A process for producing a chip board according to claim 1 comprising producing said chip board by means of an intermittent press or by a continuous pressing procedure at a temperature of 150.degree. C. to 230.degree. C. and a pressure of 20 to 50 bars, the pressing period being 5 to 15 seconds per mm of the thickness dimension of the chip board.

6. A chip board according to claim 1 comprising providing an outer layer (3) on the surface of each layer (2) of large chips, wherein the outer layers include a chip mixture having chip fractions of a chip size of 0.1 to 10 mm.

7. A process for the preparation of chip boards according to claim 1 comprising scattering different chip mixtures on a press plate, a wire, or a scatter band to form an intermediary layer, a layer of large chips positioned on both sides of said intermediary layer, as well as outer layers positioned on the outer surface of the layer of large chips, every chip of the intermediary layer (1) being randomly oriented during scattering while the chips of the individual layer of large chips are oriented in one and the same direction during the scattering, said process further comprising compressing the layers at a temperature of 150 to 230.degree. C. and a pressure of 20 to 50 bars, the pressing period being 5 to 15 seconds per mm of the thickness dimension of the chip board.

8. A process according to claim 7 further comprising compressing the components of the chip board to such an extent that the chip board achieves a density of 600 to 800 kglm.sup.3.

9. A process according to claim 8 wherein the chip board achieves a density of 650 to 750 kg/km.sup.3.

10. A chip according to claim 3 wherein the length is 80 to 110 mm, the width is 10 to 20 mm, and the thickness is 0.4 to 1.0 mm.

11. A chip board according to claim 4 wherein the chips are kept together by 10 to 13% by weight of adhesive.

12. A chip board according to claim 4 wherein the adhesive comprises a urea-formaldehyde adhesive.

13. A chip board according to claim 4 wherein the adhesive comprises a melamine-urea formaldehyde adhesive.

14. A chip board according to claim 4 wherein the adhesive comprises an isocyanate adhesive.

15. A chip board according to claim 4 wherein the adhesive comprises a tannin adhesive.

16. A chip board according to claim 6 wherein the chip size is 0.1 to 5 mm.

17. A process according to claim 7 wherein the pressing period is 8 to 13 seconds.

* * * * *